United States Patent
Liu et al.

(10) Patent No.: US 11,110,347 B2
(45) Date of Patent: Sep. 7, 2021

(54) GAME SERVER SWITCHING METHOD, APPARATUS, AND SYSTEM

(71) Applicant: TENCENT TECHNOLOGY (SHENZHEN) COMPANY LIMITED, Guangdong (CN)

(72) Inventors: Lin Liu, Shenzhen (CN); Xiao Cheng Ding, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 244 days.

(21) Appl. No.: 16/354,549

(22) Filed: Mar. 15, 2019

(65) Prior Publication Data

US 2019/0209921 A1 Jul. 11, 2019

Related U.S. Application Data (63) Continuation of application No. PCT/CN2018/072975, filed on Jan. 17, 2018.

(30) Foreign Application Priority Data

Jan. 24, 2017 (CN) .......................... 201710060358.7

(51) Int. Cl.
*A63F 13/352* (2014.01)
*A63F 13/335* (2014.01)
*H04L 29/08* (2006.01)

(52) U.S. Cl.
CPC .......... *A63F 13/352* (2014.09); *A63F 13/335* (2014.09); *H04L 67/1008* (2013.01);
(Continued)

(58) Field of Classification Search
USPC .......................................................... 463/42
See application file for complete search history.

(56) References Cited

U.S. PATENT DOCUMENTS

| 9,270,733 B2 * | 2/2016 | Ruppert | .................. | H04L 67/34 |
| 2007/0184903 A1 * | 8/2007 | Liu | .......................... | A63F 13/12 |
| | | | | 463/42 |

(Continued)

FOREIGN PATENT DOCUMENTS

| CN | 101266633 A | 9/2008 |
| CN | 104683252 A | 6/2015 |

(Continued)

OTHER PUBLICATIONS

International Search Report for PCT/CN2018/072975 dated Apr. 20, 2018 [PCT/ISA/210].

(Continued)

*Primary Examiner* — Pierre E Elisca
(74) *Attorney, Agent, or Firm* — Sughrue Mion, PLLC (57) ABSTRACT

A game server switching method, applied to a game server switching system, is provided, the game server switching system including a load balancer, a network-layer access subsystem, a network-layer proxy subsystem, a game logic subsystem, and a role login management server. A communication connection is established between the network-layer access subsystem and the second game server based on the route switching request message. A write-back request is sent by the first game server to the role login management server. User role data are sent by the role login management server to the second game server based on the write-back request. In response to obtaining the user role data from the role login management server, the game data are sent by the second game server to the game client by using the network-layer proxy subsystem, the network-layer access subsystem, and the load balancer.

20 Claims, 6 Drawing Sheets

(52) U.S. Cl.
CPC ...... *H04L 67/1014* (2013.01); *H04L 67/2814* (2013.01); *H04L 67/327* (2013.01)

(56) References Cited

U.S. PATENT DOCUMENTS

| | | | | |
|---|---|---|---|---|
| 2008/0288639 A1* | 11/2008 | Ruppert | .................... | G06F 8/60 |
| | | | | 709/225 |
| 2009/0029775 A1* | 1/2009 | Ruppert | .................. | H04L 67/26 |
| | | | | 463/42 |
| 2009/0215541 A1* | 8/2009 | Liu | ..................... | G07F 17/3276 |
| | | | | 463/42 |
| 2010/0151926 A1* | 6/2010 | Ruppert | .................. | H04L 12/18 |
| | | | | 463/1 |
| 2012/0208636 A1* | 8/2012 | Feige | .................... | A63F 13/525 |
| | | | | 463/31 |
| 2012/0233306 A1* | 9/2012 | Ruppert | ................ | G07F 17/323 |
| | | | | 709/223 |
| 2012/0289347 A1* | 11/2012 | Guo | ...................... | A63F 13/358 |
| | | | | 463/42 |
| 2016/0358283 A1* | 12/2016 | Regala | .................... | A63F 13/87 |
| 2017/0084082 A1* | 3/2017 | McTaggart | .............. | H04L 67/18 |
| 2020/0368614 A1* | 11/2020 | Vilola | ................... | A63F 13/352 |

FOREIGN PATENT DOCUMENTS

| | | |
|---|---|---|
| CN | 104954321 A | 9/2015 |
| CN | 105978746 A | 9/2016 |
| CN | 106921730 A | 7/2017 |
| WO | 2006/020504 A2 | 2/2006 |

OTHER PUBLICATIONS

Communication dated May 5, 2019, from the State Intellectual Property Office of People's Republic of China in counterpart Application No. 201710060358.7.

* cited by examiner

GAME SERVER SWITCHING METHOD, APPARATUS, AND SYSTEM

CROSS-REFERENCE TO RELATED APPLICATION(S)

This application is a continuation of International Application No. PCT/CN2018/072975, filed on Jan. 17, 2018, in the Chinese Patent Office, which claims priority to Chinese Patent Application No. 201710060358.7, filed on Jan. 24, 2017, in the Chinese Patent Office, and entitled "GAME SERVER SWITCHING METHOD AND SYSTEM", the disclosures of which are incorporated by reference in their entireties.

BACKGROUND

1. Field

The disclosure relates to the field of computer technologies, and in particular, to a game server switching method, an apparatus, and a system.

2. Description of the Related Art

Network games are a virtual world in which a player has his own game identity such as class, prestige, and empirical value, and all of the information is formed by a large amount of data. Also, the player is growing and changing, and therefore the game data is continuously updated. In a multi-zone, multi-server game architecture, different game data is stored in different game servers, and a game client needs to be started to obtain the game data. A game server is logged in to by using the game client, and the game client needs to be switched to different game servers to obtain the game data stored in the different game servers.

In various mobile games, a player plays games by connecting a game client to a game server. However, in a current massively multiplayer online role-playing game (MMORPG), multi-zone, multi-server architecture setting and operation are used. Normally, a large zone is divided based on a network operator or a platform, and each large zone includes a plurality of specific small game zones. A small game zone normally includes one or more game servers, the player selects to log in to one small game zone of a large zone to play games. Various plays of the MMORPG may require the player to redirect between different game maps, and the different game maps are normally deployed on different game servers of the small game zone. If a game map on which the player is currently located and a target game map are not on the same game server, the player needs to switch and redirect between the game servers on which a source game map and the destination game map are respectively deployed.

Figure 1:
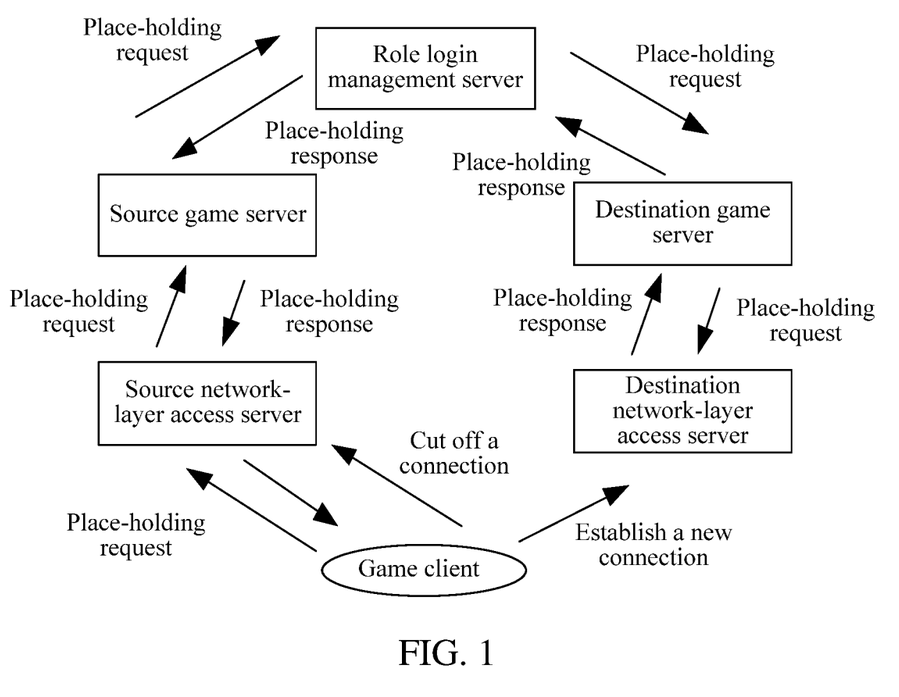
FIG. 1 is a schematic diagram of a system architecture in which a game client actively cuts off a connection to a source game server and establishes a new connection to a target game server in the related art technology.

A game server redirection manner that is most commonly used in the industry is that the game client first actively cuts off a connection to a source game server, and then re-establishes a connection to a target game server, and continues to play games after the connection is successfully established. FIG. 1 is a schematic diagram of a system architecture in which a game client actively cuts off a connection to a source game server and establishes a new connection to a target game server in the related art technology. When a player selects to cross a game map, the game client actively initiates a map-redirection request to the source game server. When a game server on which a target map is located is not a game server on which the player is located, the source game server sends a place-holding request of server redirection to the target game server. When a target server successfully performs place-holding, the target server returns a place-holding response to the source game server. After receiving the place-holding response, the source game server returns the place-holding response to the game client. After receiving the returned place-holding response, the game client obtains an address of the target game server, and then the game client actively cuts off a network connection to the source game server and re-establishes a network connection to the target game server to continue to play games.

In the related art technology, the game client first actively cuts off a connection to the source game server, then re-connects to the target game server, and continues to play games after the connection is successfully established. This unavoidably causes the player to be offline. In addition, due to a network status, especially when currently a signal is bad or when a base station is switched, a network status of a mobile network is very unstable, and switching of game server connection increases time in which the player is offline.

SUMMARY

One or more exemplary embodiments provide a game server switching method, an apparatus, and a system, in which game server switching can be performed without being perceived by the user, thereby solving problem that a user is offline when a game client is switched to different game servers.

According to an aspect of an exemplary embodiment, provided is a game server switching method.

The game server switching method is applied to a game server switching system, the game server switching system including a load balancer, a network-layer access subsystem, a network-layer proxy subsystem, a game logic subsystem, and a role login management server.

A communication connection is established between the load balancer and a game client, the load balancer being connected to the network-layer access subsystem, the network-layer access subsystem being connected to the network-layer proxy subsystem, the network-layer proxy subsystem being connected to the game logic subsystem, the game logic subsystem being connected to the role login management server, and the game logic subsystem including a first game server and a second game server, the first game server communicating with the game client by using the network-layer proxy subsystem, the network-layer access subsystem, and the load balancer.

The first game server determines, based on a game data obtaining request from the game client, that the first game server does not store game data requested by the game data obtaining request, and sends a route switching request message to the network-layer access subsystem by using the network-layer proxy subsystem.

The network-layer access subsystem establishes a communication connection between the network-layer access subsystem and the second game server based on the route switching request message.

The first game server sends a write-back request to the role login management server.

The role login management server, in response to receiving the write-back request, sends user role data to the second game server based on the write-back request The second game server, in response to obtaining the user role data from the role login management server, sends the game data to the game client by using the network-layer proxy subsystem, the network-layer access subsystem, and the load balancer.

According to an aspect of another exemplary embodiment, provided is a game server switching system, including a load balancer, a network-layer access subsystem, a network-layer proxy subsystem, a game logic subsystem, and a role login management server, a communication connection being established between the load balancer and a game client, the load balancer being connected to the network-layer access subsystem, the network-layer access subsystem being connected to the network-layer proxy subsystem, the network-layer proxy subsystem being connected to the game logic subsystem, the game logic subsystem being connected to the role login management server, and the game logic subsystem including a first game server and a second game server, the first game server communicating with the game client by using the network-layer proxy subsystem, the network-layer access subsystem, and the load balancer; and the first game server being configured to: determine, based on a game data obtaining request from the game client, that the first game server does not store game data requested by the game data obtaining request; and send a route switching request message to the network-layer access subsystem by using the network-layer proxy subsystem;

the network-layer access subsystem being configured to establish a communication connection between the network-layer access subsystem and the second game server based on the route switching request message, the second game server storing the game data requested by the game data obtaining request;

the first game server being further configured to send a write-back request to the role login management server;

the role login management server being configured to send user role data to the second game server based on the write-back request in response to receiving the write-back request; and the second game server being configured to: send, in response to obtaining the user role data from the role login management server, the game data to the game client by using the network-layer proxy subsystem, the network-layer access subsystem, and the load balancer.

According to an aspect of still another exemplary embodiment, provided is a server, applied to a game switching system, the game switching system including a load balancer, a network-layer access subsystem, a network-layer proxy subsystem, a game logic subsystem, and a role login management server, and the server being a load balancer, a network-layer access subsystem, a network-layer proxy subsystem, a game logic subsystem, or a role login management server; and the server including a memory and a processor, the memory being configured to store a program and an instruction;

the processor being configured to execute the program stored in the memory; and the processor being configured to invoke the program instruction in the memory, to perform the method performed by the server according to the first aspect.

According to an aspect of still another exemplary embodiment, provided is a computer-readable storage medium, including an instruction, and the instruction, when run on a computer, causing the computer to perform the method performed by the first game server according to the first aspect, or perform the method performed by the network-layer access subsystem according to the first aspect, or perform the method performed by the role login management server according to the first aspect, or perform the method performed by the second game server according to the first aspect.

It can be seen from the foregoing technical solutions that, the embodiments of the present invention have the following advantages:

In the embodiments of the present invention, the first game server communicates with the game client by using the network-layer proxy subsystem, the network-layer access subsystem, and the load balancer; the game client sends the game data obtaining request to the first game server; the first game server determines that the first game server does not store the game data requested by the game data obtaining request, and sends the route switching request message to the network-layer access subsystem by using the network-layer proxy subsystem; the network-layer access subsystem establishes the communication connection between the network-layer access subsystem and the second game server based on the route switching request message; the first game server sends the write-back request to the role login management server; the role login management server sends the user role data to the second game server based on the write-back request; and the second game server sends, in response to receiving the user role data from the role login management server, the game data to the game client by using the network-layer proxy subsystem, the network-layer access subsystem, and the load balancer. In the embodiments of the present invention, when the communication connection between the game client and the load balancer remains unchanged, the first game server may trigger, by using the network-layer proxy subsystem, the network-layer access subsystem to establish a connection to the second game server, so that the second game server may provide game data not stored in the first game server to the game client, and therefore the game client may be switched to communication with the second game server without being perceived by the user, to solve a problem in the related art technology that the user is offline when the game client is switched to different game servers.

BRIEF DESCRIPTION OF THE DRAWINGS

To describe the technical solutions in the embodiments of the disclosure more clearly, the following briefly describes the accompanying drawings required for describing the embodiments. Apparently, the accompanying drawings in the following descriptions show merely some embodiments of the disclosure, and persons skilled in the art may still derive other drawings from these accompanying drawings.

DETAILED DESCRIPTION

Embodiments provide a game server switching method, an apparatus, and a system, to solve a problem that a user is offline when a game client is switched to different game servers, so that game server switching can be performed without being perceived by the user.

To make the invention objectives, features, and advantages of the disclosure clearer and more comprehensible, the following clearly and completely describes the technical solutions in the exemplary embodiments with reference to the accompanying drawings. Apparently, the exemplary embodiments described in the following are merely some rather than all of the embodiments of the disclosure. All other embodiments that can be obtained by persons skilled in the art based on the exemplary embodiments described herein should fall within the protection scope.

In the specification, claims, and the foregoing drawings of the disclosure, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Detailed descriptions are separately provided below.

The game server switching method provided in the exemplary embodiments may be specifically applied to game server switching without being perceived by a user, to obtain game data when a game client is not offline. The game server switching method provided in the embodiments is related to system network elements such as a load balancer, a network-layer access subsystem, a network-layer proxy subsystem, a game logic subsystem, and a role login management server. The game client is a terminal that performs game interaction with the game logic subsystem. For example, the game client may be a League of Legends (LOL) client game and a palm hero application (APP). The game server may be an LOL server. The load balancer may be in a continuous communication connection to the game client.

To solve a problem in the related art technology that a player is offline when a game server connection is switched, in the embodiments of the disclosure, when the game client performs switching and redirection between game servers, the game client uses a continuous connection manner, to be specific, the game client and the game server remain an original client/server (C/S) connection. A technical solution of continuous connection and game server redirection is used in the exemplary embodiments. This is completely transparent to the game client and no additional procedure and processing need to be performed, and data route redirection is performed on a daemon of the game server, thereby preventing the player from being offline, and improving game experience of the player.

Figure 2:
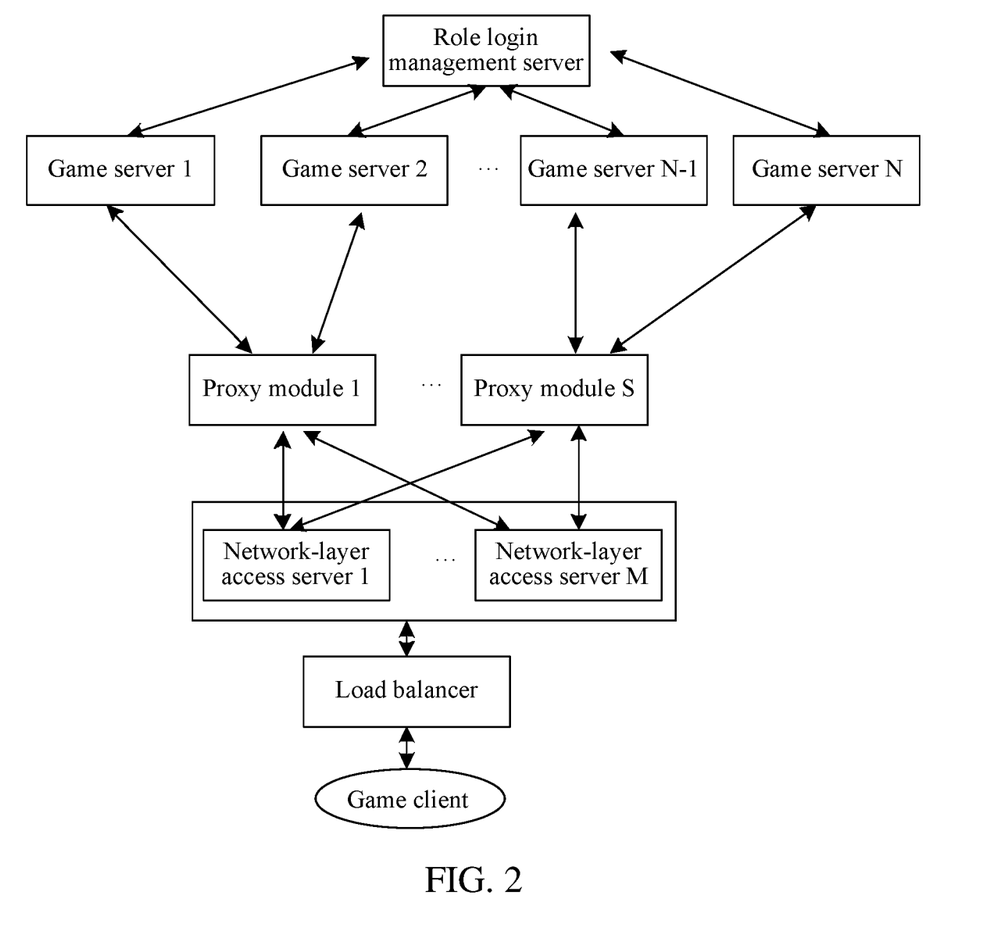
FIG. 2 is a schematic architectural diagram of a game server switching system according to an embodiment.

To solve a problem in the related art technology that a game client is offline when game server switching is performed in a multi-zone, multi-server game architecture, an exemplary embodiment provides a game server switching system. FIG. 2 is a schematic architectural diagram of a game server switching system according to an embodiment. The game server switching system provided in this embodiment includes a load balancer, a network-layer access subsystem, a network-layer proxy subsystem, a game logic subsystem, a role login management server, and a game client. A communication connection is established between the game client and the load balancer. For example, the load balancer provides an accessible Internet Protocol (IP) address and a port number, the game client communicates with the load balancer by using the IP address and the port number, and the load balancer is connected to the network-layer access subsystem. The network-layer access subsystem includes at least one network-layer access server, and all network-layer access servers in the network-layer access subsystem may provide an interactive application service to the game client. The load balancer may determine a to-be-selected network-layer access server. The network-layer access subsystem in this embodiment provides an access server as a whole, and a plurality of game clients may share these access resources. A hardware environment and software deployment of the network-layer access subsystem may be completed in a manner of batch deployment, and any network-layer access server in the network-layer access subsystem may provide an interactive application service to the client. Likewise, the network-layer proxy subsystem in this embodiment includes at least one network-layer proxy module, and the game logic subsystem includes at least one game server. Each network-layer proxy module is responsible for managing one or more game servers. For example, the first game server and the second game server may be managed by the same network-layer proxy module, or may be managed by different network-layer proxy modules. The disclosure is not limited herein. Each network-layer proxy module may communicate with all the network-layer access servers in the network-layer access subsystem.

The load balancer is configured to implement multi-network unified access and support load balance. The game client can be averagely allocated to an access server provided that the game client is connected to an IP and port of a unified open load balancer.

Next, the game server switching method provided in this embodiment is described in detail through an interaction process between the load balancer, the network-layer access subsystem, the network-layer proxy subsystem, the game logic subsystem, and the role login management server. FIG. 2 shows a game server switching method according to an embodiment. The game server switching method is applied to a game server switching system, and the game server switching system includes a load balancer, a network-layer access subsystem, a network-layer proxy subsystem, a game logic subsystem, and a role login management server. A communication connection is established between the load balancer and a game client. The load balancer is connected to the network-layer access subsystem. The network-layer access subsystem is connected to the network-layer proxy subsystem. The network-layer proxy subsystem is connected to the game logic subsystem. The game logic subsystem is connected to the role login management server. The game logic subsystem includes a first game server and a second game server. The first game server communicates with the game client by using the network-layer proxy subsystem, the network-layer access subsystem, and the load balancer.

Figure 3:
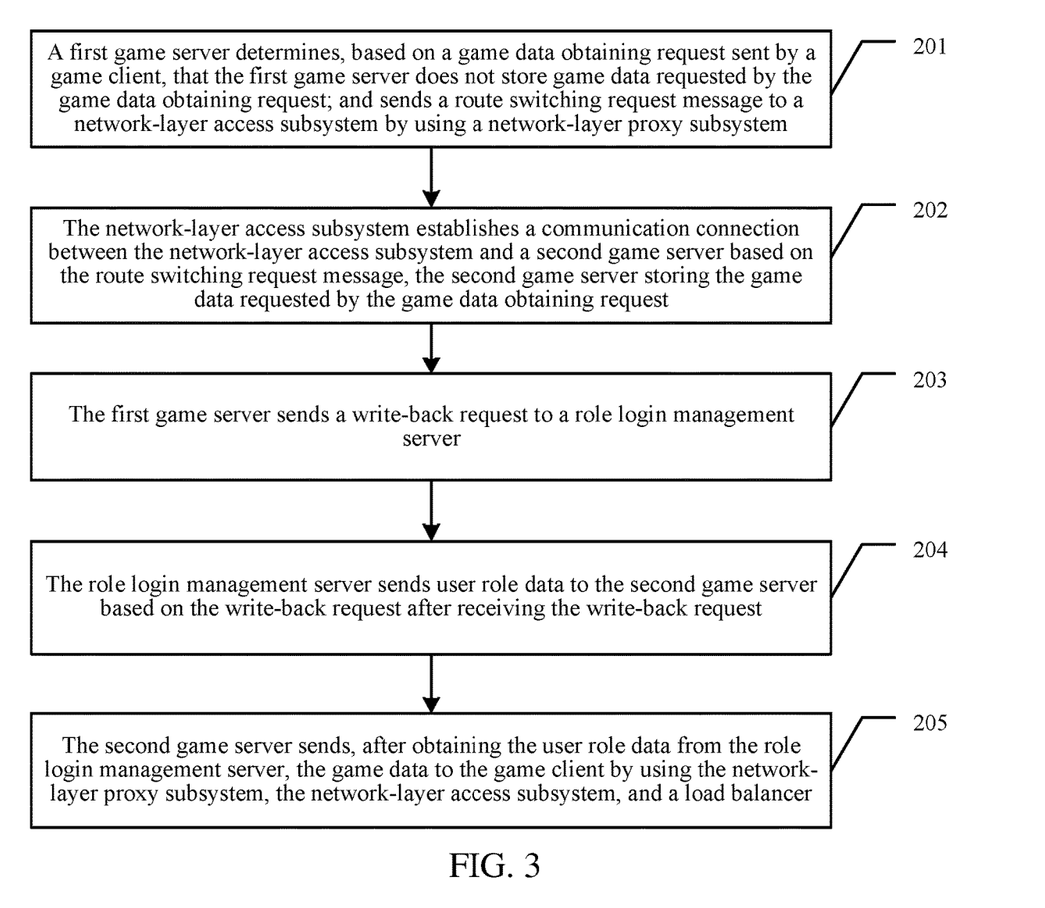
FIG. 3 is a schematic block diagram of a procedure of a game server switching method according to an embodiment.

FIG. 3 is a schematic diagram of steps of an embodiment of a game service switching method according to an embodiment. The game server switching method shown in FIG. 3 may include operations 201-205.

201. A first game server determines, based on a game data obtaining request sent by a game client, that the first game server does not store game data requested by the game data obtaining request; and sends a route switching request message to a network-layer access subsystem by using a network-layer proxy subsystem.

In this embodiment, a game logic subsystem includes a first game server and a second game server. The game logic subsystem may include a plurality of game servers. The first game server shown herein may be a source game server that already establishes a communication connection to the game client. For ease of description, the second game server is used as a destination game server. When the first game server and the game client establish the communication connection, the game client may send the game data obtaining request to the first game server. For example, a user performs various game interactions with the first game server by using the game client, for example, leveling up by killing monsters and purchasing equipments.

The first game server obtains the game data obtaining request from the game client. When the first game server determines that the first game server does not store the game data requested by the game data obtaining request, it indicates that the first game server cannot provide a game service to the game client. In this case, the first game server needs to be switched to another game server in the game logic subsystem. The another server stores the game data requested by the game data obtaining request. For example, in a mobile game of a nation battle type, the game client interacts with the first game server by using a game map 1. When the game client needs to be switched to a game map 2, the game client may send a request of obtaining the game map 2 to the first game server. In this case, the first game server does not store the game map 2.

When the first game server does not store the game data required by the game client, the first game server may trigger game server switching, and the first game server sends a route switching request message to the network-layer proxy subsystem. Then, the network-layer proxy subsystem forwards the route switching request message to the network-layer access subsystem, and the network-layer access subsystem receives the route switching request message sent by the first game server. Step 202 is performed next, which will be described later.

In some embodiments, in addition to the foregoing step, the game server switching method provided in this embodiment may include the following steps:

A1. The load balancer receives the game data obtaining request sent by the game client.

A2. The load balancer sends the game data obtaining request to the network-layer access subsystem.

A3. After receiving the game data obtaining request, the network-layer access subsystem sends the game data obtaining request to the network-layer proxy subsystem.

A4. After receiving the game data obtaining request, the network-layer proxy subsystem sends the game data obtaining request to the first game server in the game logic subsystem.

In this embodiment, the game client remains in connection to the load balancer, and the game data obtaining request sent by the game client is forwarded to the first game server through the following approach: the load balancer—the network-layer access subsystem—the network-layer proxy subsystem. The game client may communicate with the load balancer. When needing to use the interactive application service, the game client may send interactive application request data to the load balancer, and the load balancer may obtain the interactive application request data from the game client. Illustration of an example scenario is made as follows: In a game scenario, when playing a network game by using the game client, the user may send game request data to the load balancer by using the game client, and the load balancer receives the game request data of the user. In this embodiment, the load balancer may be installed between the network-layer access subsystem and an external network, and the load balancer may complete a server selection task due to a dedicated device, is independent from an operating system, and has very high performance as a whole. During actual application, the load balancer may further set diversified load balancing policies and intelligent traffic management, to meet an optimal load balance requirement.

In some embodiments, step 201 of determining, by a first game server based on a game data obtaining request sent by a game client, that the first game server does not store game data requested by the game data obtaining request includes:

B1. The first game server determines, based on the game data obtaining request sent by the game client, whether the first game server stores the game data requested by the game data obtaining request.

B2. The first game server determines, if the game data is not stored in the first game server, that the first game server does not store the game data.

The first game server receives the game data obtaining request sent by the game client, and then the first game server may check all locally stored game data, to search for whether there is the game data requested by the game data obtaining request. For example, the game data requested by the game data obtaining request may be searched for by using a name of the game data or the identifier of the game data, and if the game data requested by the game data obtaining request cannot be searched for, the first game server determines that the first game server does not store the game data.

In some other embodiments, after step 201 of determining, by a first game server based on a game data obtaining request sent by a game client, that the first game server does not store game data requested by the game data obtaining request, the game server switching method provided in this embodiment may include the following steps:

C1. The first game server sends a redirection and place-holding request message to the second game server by using the network-layer proxy subsystem.

C2. The second game server sends, after receiving the redirection and place-holding request message, a redirection and place-holding success message to the first game server by using the network-layer proxy subsystem.

C3. The first game server receives the redirection and place-holding success message.

To ensure that the game client can be successfully switched to the second game server, the first game server may interact with the second game server by using the network-layer proxy subsystem, to determine whether the second game server can provide game data to the game client. If the second game server can provide the game data, the second game server may send the redirection and place-holding success message to the first game server by using the network-layer proxy subsystem. The first game server receives the redirection and place-holding success message, so that the first game server can determine that the second game server can provide the game data required by the game client to the game client.

Further, in an exemplary implementation step C1 to step C3, in some other embodiments, after step C3 of receiving, by the first game server, the redirection and place-holding success message, the game server switching method provided in this embodiment may include the following steps:

D1. The first game server sends a switching notification message to the network-layer access subsystem.

D2. The network-layer access subsystem forwards, after receiving the switching notification message, the switching notification message to the load balancer.

D3. The load balancer forwards, after receiving the switching notification message, the switching notification message to the game client, so that the game client stops sending a role operation request to the first game server.

In this embodiment, the game client remains in connection to the load balancer, and an approach through which the switching notification message of the first game server is forwarded to the game client is as follows: the network-layer proxy subsystem—the network-layer access subsystem—the load balancer. The game client may communicate with the load balancer. The load balancer forwards, after receiving the switching notification message, the switching notification message to the game client. The game client stops sending the role operation request to the first game server, to avoid an operation failure caused due to continuous interaction between the game client and the first game server.

202. The network-layer access subsystem establishes a communication connection between the network-layer access subsystem and a second game server based on the route switching request message, the second game server storing the game data requested by the game data obtaining request.

In this embodiment, because the second game server stores the game data requested by the game data obtaining request, the network-layer access subsystem establishes the communication connection between the network-layer access subsystem and the second game server when being triggered by the first game server, that is, the network-layer access subsystem causes the route to be switched from the first game server to the second game server. It should be noted that, the game logic subsystem includes a plurality of game servers, and if a game server stores the game data required by the game client, the network-layer access subsystem may establish a communication connection to the game server.

It should be noted that, in some embodiments, after step 202 of establishing, by the network-layer access subsystem, a communication connection between the network-layer access subsystem and a second game server based on the route switching request message, the game server switching method provided in this embodiment may include the following steps:

E1. The network-layer access subsystem sends the route switching success message to the first game server by using the network-layer proxy subsystem.

E2. The first game server triggers performance of the following step after receiving the route switching success message: sending, by the first game server, a write-back request to a role login management server.

The network-layer access subsystem establishes the communication connection between the network-layer access subsystem and the second game server. If the communication connection is successfully established, the network-layer access subsystem may then send a route switching success message to the first game server by using the network-layer proxy subsystem. After receiving the route switching success message, the first game server may determine that the communication connection between the network-layer access subsystem and the second game server is established, to determine that the second game server may provide the game data to the game client by using the network-layer access subsystem. In some embodiments, steps E1 and E2 may not be performed. Instead, after step 201 is performed, a preset time period is left, and the preset time period is used for establishing the communication connection between the network-layer access subsystem and the second game server. After the preset time period elapses, performance of step 203 is directly triggered. A specific implementation depends on an application scenario. The disclosure is not limited herein.

203. The first game server sends a write-back request to a role login management server.

In this embodiment, after triggering the establishment of the communication connection between the network-layer access subsystem and the second game server, the first game server may send the write-back request to the role login management server. The write-back request is used to trigger the role login management server to sort user role data of a user role that operates the game client and to trigger the role login management server to forward the user role data to the second game server.

In some embodiments, before sending the write-back request to the role login management server, the first game server may further sort a local online player list, and delete the user role that sends the game data obtaining request from the online player list, to no longer provide the game data to the user role after deleting the user role data. Instead, the second game server in the game logic subsystem continues to provide the game data to the user role that sends the game data obtaining request.

204. The role login management server sends user role data to the second game server based on the write-back request after receiving the write-back request.

In this embodiment, the role login management server is responsible for interacting with a database, and pulling and writing back the user role data, to store the user role data in the online player list. The role login management server is connected to each game server in the game logic subsystem. The role login management server may further implement message forwarding, verification of written-back data, verification of unique login, support connection to a plurality of game servers, and is responsible for message transformation in the game servers.

205. The second game server sends, after obtaining the user role data from the role login management server, the game data to the game client by using the network-layer proxy subsystem, the network-layer access subsystem, and a load balancer.

In this embodiment, the second game server is the target game server that the game client needs to be switched to. The second game server may recover the user role data locally after obtaining the user role data from the role login management server, for example, add the user role to the online player list. Then, the second game server sends the game data to the game client by using the network-layer proxy subsystem, the network-layer access subsystem, and the load balancer, so that the game client may obtain the game data required by the user from the second game server. For example, the first game server stores the game map 1. Without being perceived by the user, the game client requests the load balancer that the game client needs to obtain the game map 2, and the game client may automatically switch to the second game server to perform communication, to obtain the game map 2 from the second game server.

In some embodiments, after step 205 of obtaining, by the second game server, the user role data from the role login management server, the game server switching method provided in this embodiment may include the following step:

F1. The second game server sends a game server switching success message to the game client by using the network-layer proxy subsystem, the network-layer access subsystem, and the load balancer.

The second game server may further send the game server switching success message to the game client after obtaining the user role data from the role login management server, and the game client may determine, based on the game server switching success message, that the game client is already switched to the second game server. In this case, the game client may switch a game scenario.

It can be learned from the descriptions of the embodiments that, the first game server communicates with the game client by using the network-layer proxy subsystem, the network-layer access subsystem, and the load balancer; the game client sends the game data obtaining request to the first game server; the first game server determines that the first game server does not store the game data requested by the game data obtaining request, and sends the route switching request message to the network-layer access subsystem by using the network-layer proxy subsystem; the network-layer access subsystem establishes the communication connection between the network-layer access subsystem and the second game server based on the route switching request message; the first game server sends the write-back request to the role login management server; the role login management server sends the user role data to the second game server based on the write-back request; and the second game server sends, after receiving the user role data sent by the role login management server, the game data to the game client by using the network-layer proxy subsystem, the network-layer access subsystem, and the load balancer. In the embodiments, when the communication connection between the game client and the load balancer remains unchanged, the first game server may trigger, by using the network-layer proxy subsystem, the network-layer access subsystem to establish a connection to the second game server, so that the second game server may provide game data not stored in the first game server to the game client, and therefore the game client may be switched to communication with the second game server without being perceived by the user, to solve a problem in the related art technology that the user is offline when the game client is switched to different game servers.

For better understanding and implementation of the foregoing solutions of the embodiments, specific descriptions are provided below by using examples of corresponding application scenarios.

In the related art technology, when a player switches a game map, the player needs to redirect a game server, and the game client cuts off an original connection and re-establishes a connection to the target game server. When a signal is bad or a base station is switched, a network status of a mobile network is very unstable, and if the game client switches a game server connection at this time, the player offline time is greatly increased, and game experience of the player is greatly affected. In the related art technology, an entire process of map switching and game server redirection is not transparent to the game client, and the game client needs to cooperate and initiate the process. As a result, a complexity degree of developing a client is increased. A technical solution of continuous connect and redirect a game server is used in this embodiment, game map switching and game server redirection are transparent to the game client, and are not perceived by a user operating the game client. In addition, the game client does not need to additionally cooperate with the development and redirection procedure, thereby solving a deficit of the related art technology.

Referring to FIG. 2, in a nation battle game, a player normally needs to be transmitted, by using a home country border map, to an enemy country to perform a battle activity. In this case, the player clicks non-player-controlled character (NPC) to perform country map redirection. If a target country map and a home country map are deployed on different servers, game map switching and game server redirection need to be performed. The load balancer is connected to the network-layer access subsystem. The network-layer access subsystem includes M network-layer access servers: a network-layer access server 1, . . . , and a network-layer access server M. The network-layer proxy subsystem includes S network-layer proxy modules: a network-layer proxy module 1, . . . , and a network-layer proxy module S. The game logic subsystem totally includes a game server 1, a game server 2, . . . , a game server N−1, and a game server N. The N game servers are connected to the role login management server.

For example, a small game zone has a plurality of network-layer access servers, and each network-layer access server is set to be equal. To prevent the need for the game client to know details of information of each network-layer access server such as address and port when connecting to the network-layer access server, and to provide a simple connection and interaction procedure between the game client and an access server, a load balancer is added to the network layer to implement multi-network unified access and support automatic load balance. The game client may be averagely allocated to a network-layer access server provided that the game client is connected to an IP and port of a unified open load balancer. In order for a mobile client to continuously connect and redirect the game server, route switching needs to be directly performed in the game server. A network-layer proxy module is added before the network-layer access server and the game server, so that the game server is connected to a plurality of network layers in a small game zone by using a transmission control protocol (Transmission Control Protocol, TCP). Each network-layer proxy module is responsible for managing 1 to N game servers.

Figure 4:
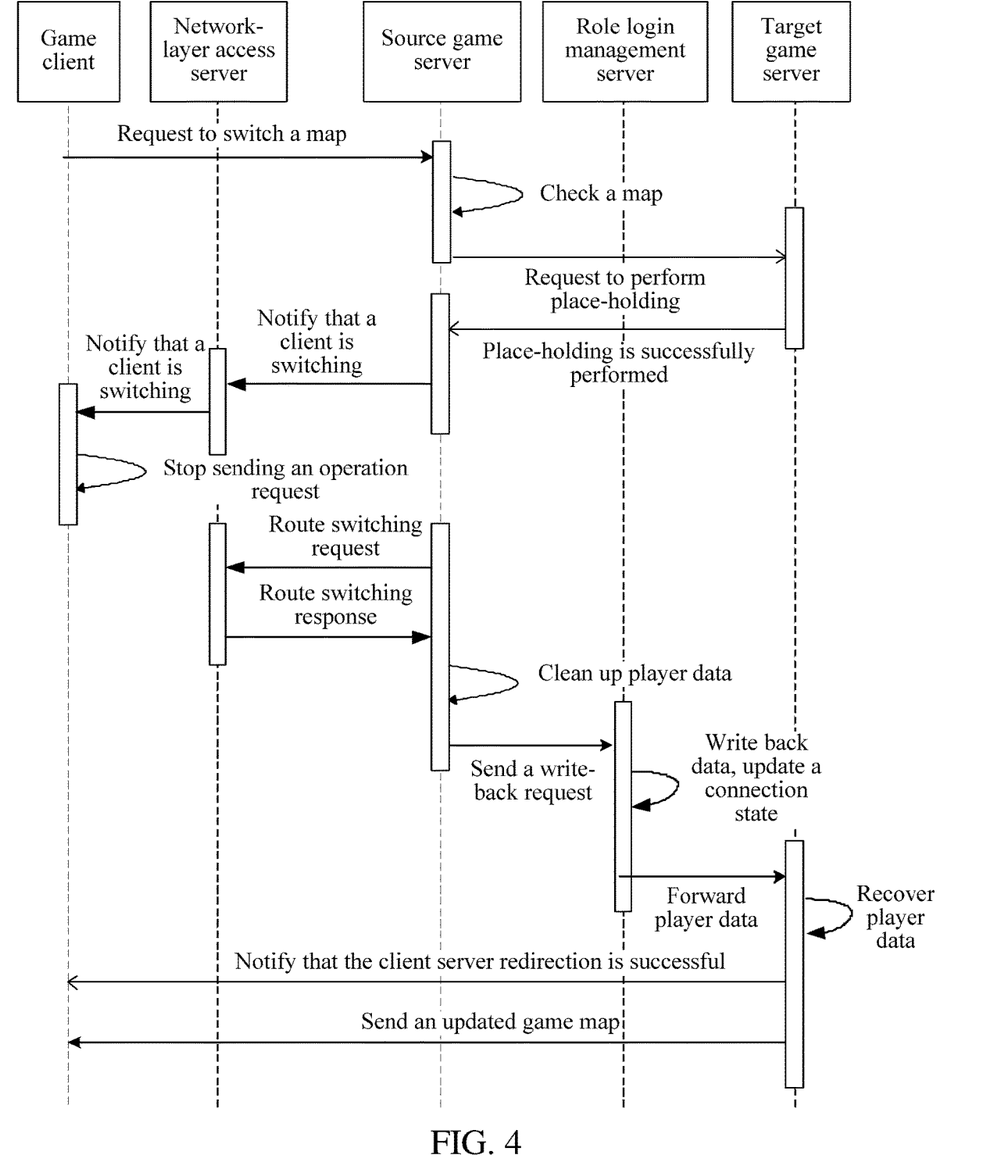
FIG. 4 is a schematic flowchart in which each element in a game server switching system interacts with a game client according to an embodiment.

FIG. 4 is a schematic diagram of an application scenario in which a game server switching system communicates with a game client according to an embodiment. A system that implements multi-network unified access and supports automatic load balance. A major procedure of game map switching and game server redirection may include the following:

(1) A player requests to switch a game map on the game client.

(2) A source game server checks whether a target game map is stored in the source game server.

(3) If the target game map is not in the same server, the source game server (for example, a first game server) initiates a place-holding request to a target game server (for example, a second game server).

(4) After the place-holding is successfully performed, the target game server sends a place-holding success message to the source game server.

(5) The source game server sends a server redirection notification to the game client.

(6) The game client stops sending an operation request message to the source game server.

(7) The source game server transparently instructs, by using a network-layer proxy module, a network-layer access server to perform route switching to the target game server.

(8) After the route switching is successfully performed, the network-layer access server returns a route switching success message to the source game server.

(9) The source game server cleans up player data, and sends a server redirection write-back request to a role login management server.

(10) The role login management server writes back the player data, and updates a connection state.

(11) The role login management server sends the written-back player data to the target game server.

(12) After receiving the written-back player data, the target game server recovers the player data in the target game server.

(13) After recovering the player data, the target game server notifies the game client that the game server redirection succeeds, and then notifies the game client of a game map switching message, and sends the updated game map to the game client.

(14) After receiving the game map switching message, the client starts to perform scenario switching.

In this embodiment, an original connection between the game client and the load balancer may be remained when game server switching is performed, without cutting off an old connection and establishing a new connection. This is not perceived by the player, thereby preventing the game client from being offline and from being offline for a long time due to an impact of a network.

It should be noted that, for ease of description, the foregoing method embodiments are expressed as a series of actions. However, persons skilled in the art should appreciate that the disclosure is not limited to the described action sequence, because according to the disclosure, some steps may be performed in other sequences or performed simultaneously. In addition, persons skilled in the art should also appreciate that all the embodiments described in the specification are preferred embodiments, and the related actions and modules are not necessarily mandatory to the disclosure.

To better implement the foregoing solutions of the embodiments, apparatuses used to implement the foregoing solutions are further provided below.

Figure 5:
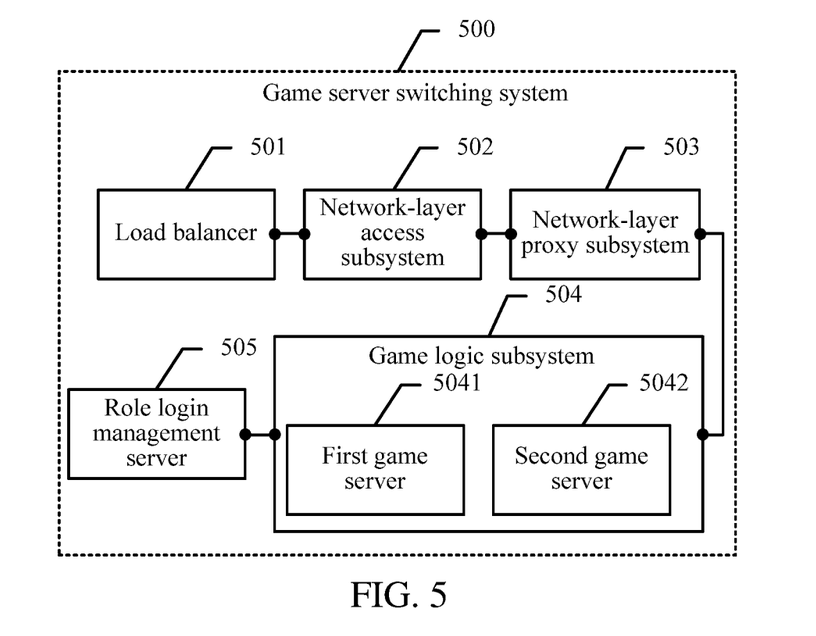
FIG. 5 is a schematic structural composition diagram of a game server switching system according to an embodiment.

FIG. 5 shows a game server switching system 500 according to an embodiment. The game server switching system 500 may include a load balancer 501, a network-layer access subsystem 502, a network-layer proxy subsystem 503, a game logic subsystem 504, and a role login management server 505.

A communication connection is established between the load balancer 501 and a game client. The load balancer 501 is connected to the network-layer access subsystem 502. The network-layer access subsystem 502 is connected to the network-layer proxy subsystem 503. The network-layer proxy subsystem 503 is connected to the game logic subsystem 504. The game logic subsystem 504 is connected to the role login management server 505. The game logic subsystem 504 includes a first game server 5041 and a second game server 5042. The first game server 5041 communicates with the game client by using the network-layer proxy subsystem 503, the network-layer access subsystem 502, and the load balancer 501.

The first game server 5041 is configured to: determine, based on a game data obtaining request sent by the game client, that the first game server 5041 does not store game data requested by the game data obtaining request; and send a route switching request message to the network-layer access subsystem 502 by using the network-layer proxy subsystem 503.

The network-layer access subsystem 502 is configured to establish a communication connection between the network-layer access subsystem 502 and the second game server 5042 based on the route switching request message, the second game server 5042 storing the game data requested by the game data obtaining request.

The first game server 5041 is further configured to send a write-back request to the role login management server 505.

The role login management server 505 is configured to send user role data to the second game server 5042 based on the write-back request after receiving the write-back request.

The second game server 5042 is configured to: after obtaining the user role data from the role login management server 505, send the game data to the game client by using the network-layer proxy subsystem 503, the network-layer access subsystem 502, and the load balancer 501.

In some embodiments, the load balancer 501 is configured to receive the game data obtaining request sent by the game client; and send the game data obtaining request to the network-layer access subsystem 502.

The network-layer access subsystem 502 is further configured to send the game data obtaining request to the network-layer proxy subsystem 503 after receiving the game data obtaining request.

The network-layer proxy subsystem 503 is further configured to send the game data obtaining request to the first game server 5041 in the game logic subsystem 504 after receiving the game data obtaining request.

In some embodiments, the first game server 5041 is configured to: determine, based on the game data obtaining request sent by the game client, whether the game data requested by the game data obtaining request is stored in the first game server 5041; and determine, if the game data is not stored in the first game server 5041, that the first game server 5041 does not store the game data.

In some embodiments, the first game server 5041 is further configured to: after determining, based on the game data obtaining request sent by the game client, that the first game server 5041 does not store the game data requested by the game data obtaining request, send a redirection and place-holding request message to the second game server 5042 by using the network-layer proxy subsystem 503.

The second game server 5042 is further configured to: send, after receiving the redirection and place-holding request message, a redirection and place-holding success message to the first game server 5041 by using the network-layer proxy subsystem 503.

The first game server 5041 is further configured to receive the redirection and place-holding success message.

In some embodiments, the first game server 5041 is further configured to send a switching notification message to the network-layer access subsystem 502 after receiving the redirection and place-holding success message.

The network-layer access subsystem 502 is further configured to forward the switching notification message to the load balancer 501 after receiving the switching notification message.

The load balancer 501 is further configured to forward the switching notification message to the game client after receiving the switching notification message, so that the game client stops sending a role operation request to the first game server 5041.

In some embodiments, the network-layer access subsystem 502 is further configured to: send, after establishing the communication connection between the network-layer access subsystem 502 and the second game server 5042 based on the route switching request message 502, a route switching success message to the first game server 5041 by using the network-layer proxy subsystem 503.

The first game server 5041 is further configured to trigger performance of the following step after receiving the route switching success message: sending, by the first game server 5041, a write-back request to the role login management server 505.

In some embodiments, the second game server 5042 is further configured to send a game server switching success message to the game client by using the network-layer proxy subsystem 503, the network-layer access subsystem 502, and the load balancer 501.

It can be learned from the descriptions of the embodiments that, the first game server communicates with the game client by using the network-layer proxy subsystem, the network-layer access subsystem, and the load balancer; the game client sends the game data obtaining request to the first game server; the first game server determines that the first game server does not store the game data requested by the game data obtaining request, and sends the route switching request message to the network-layer access subsystem by using the network-layer proxy subsystem; the network-layer access subsystem establishes the communication connection between the network-layer access subsystem and the second game server based on the route switching request message; the first game server sends the write-back request to the role login management server; the role login management server sends the user role data to the second game server based on the write-back request; and the second game server sends, after receiving the user role data sent by the role login management server, the game data to the game client by using the network-layer proxy subsystem, the network-layer access subsystem, and the load balancer. In the embodiments, when the communication connection between the game client and the load balancer remains unchanged, the first game server may trigger, by using the network-layer proxy subsystem, the network-layer access subsystem to establish a connection to the second game server, so that the second game server may provide game data not stored in the first game server to the game client, and therefore the game client may be switched to communication with the second game server without being perceived by the user, to solve a problem in the related art technology that the user is offline when the game client is switched to different game servers.

Figure 6:
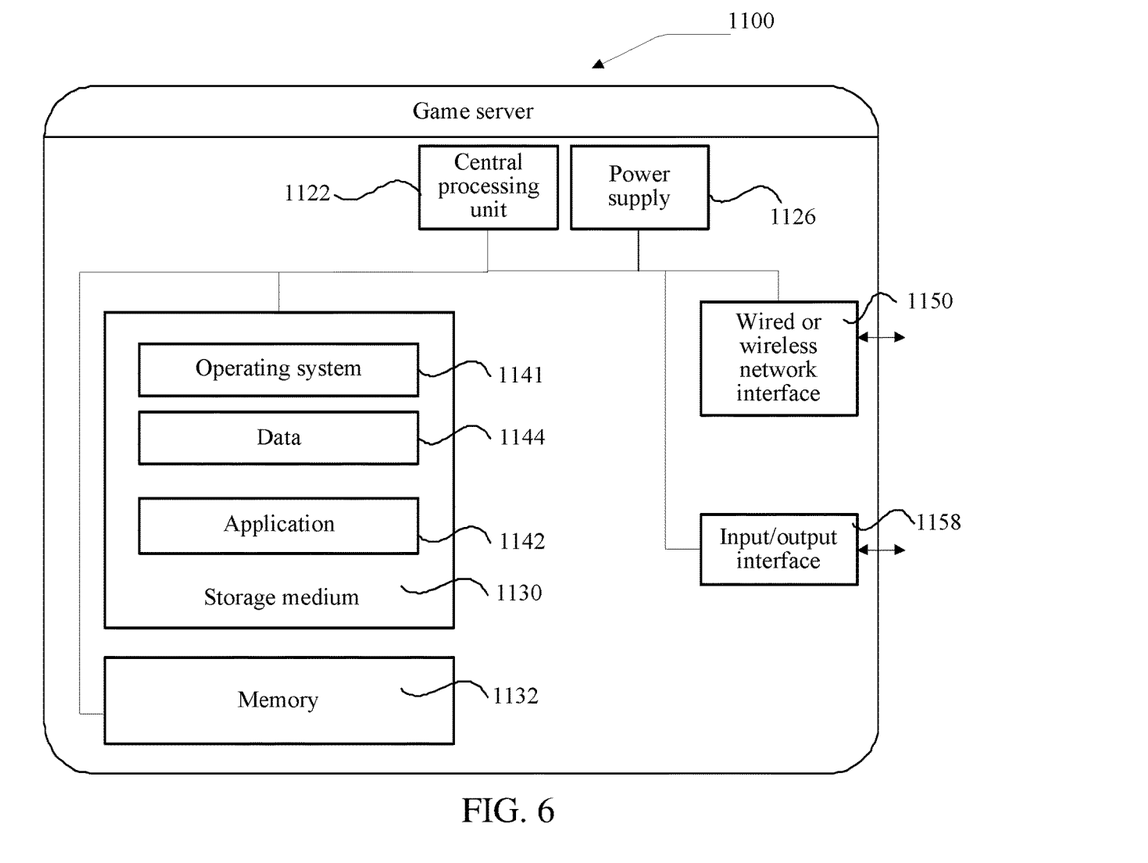
FIG. 6 is a schematic structural composition diagram of a game server according to an embodiment.

FIG. 6 is a schematic structural diagram of a server according to an embodiment. The server 1100 may vary greatly due to configuration or performance. The structure of the server may be the structure of the server in the foregoing game server switching system, for example, the server may be a load balancer, a network-layer access server, a network-layer proxy server, a game server (a first server or a second server), and/or a role login management server.

The server may include one or more central processing units (CPU) 1122 (for example, one or more processors) and a memory 1132, and one or more storage media 1130 (for example, one or more mass storage devices) that store an application 1142 or data 1144. The memory 1132 and the storage medium 1130 may be transient or persistent storages. The program stored in the storage medium 1130 may include one or more modules (which is not marked in the figure), and each module may include a series of instruction and operations to the server. Still further, the CPU 1122 may be configured to communicate with the storage medium 1130, and perform, on the server 1100, a series of instructions and operations in the storage medium 1130.

The game server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps in the switching procedure performed by the game server in the foregoing embodiment may be based on the server structure shown in FIG. 6.

An embodiment further provides a computer-readable storage medium, including an instruction. When run on a computer, the instruction causes the computer to execute the program executed by the first game server in the foregoing method embodiment, or execute any program executed by the network-layer access subsystem in the foregoing method embodiment, or execute the program executed by the role login management server in the foregoing method embodiment, or execute the program executed by the second game server in the foregoing method embodiment.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the disclosure, connection relationships between modules indicate that the modules have communication connections with each other, which may be specifically implemented as one or more communications buses or signal cables. Persons of ordinary skill in the art may understand and implement the embodiments without creative efforts.

Based on the descriptions of the foregoing implementations, persons skilled in the art may clearly understand that the disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, according to the disclosure, software program implementation may be a preferable form of implementation. Based on such an understanding, the technical solutions of the disclosure essentially or the part contributing to the related art technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments.

In conclusion, the foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A game server switching method, applied to a game server switching system, the game server switching system comprising a load balancer, a network-layer access subsystem, a network-layer proxy subsystem, a game logic subsystem, and a role login management server, a communication connection being established between the load balancer and a game client, the load balancer being connected to the network-layer access subsystem, the network-layer access subsystem being connected to the network-layer proxy subsystem, the network-layer proxy subsystem being connected to the game logic subsystem, the game logic subsystem being connected to the role login management server, and the game logic subsystem comprising a first game server and a second game server, the first game server communicating with the game client by using the network-layer proxy subsystem, the network-layer access subsystem, and the load balancer; and the method comprising:

determining, by the first game server based on a game data obtaining request from the game client, that the first game server does not store game data requested by the game data obtaining request, and sending a route switching request message to the network-layer access subsystem by using the network-layer proxy subsystem;

establishing, by the network-layer access subsystem, a communication connection between the network-layer access subsystem and the second game server based on the route switching request message;

sending, by the first game server, a write-back request to the role login management server;

sending, by the role login management server in response to receiving the write-back request, user role data to the second game server based on the write-back request; and sending, by the second game server in response to obtaining the user role data from the role login management server, the game data to the game client by using the network-layer proxy subsystem, the network-layer access subsystem, and the load balancer.

2. The game server switching method according to claim 1, further comprising:

receiving, by the load balancer, the game data obtaining request from the game client;

sending, by the load balancer, the game data obtaining request to the network-layer access subsystem;

sending, by the network-layer access subsystem in response to receiving the game data obtaining request, the game data obtaining request to the network-layer proxy subsystem; and sending, by the network-layer proxy subsystem in response to receiving the game data obtaining request, the game data obtaining request to the first game server in the game logic subsystem.

3. The game server switching method according to claim 1, wherein the determining that the first game server does not store the game data requested by the game data obtaining request comprises:

determining, by the first game server based on the game data obtaining request from the game client, whether the first game server stores the game data requested by the game data obtaining request.

4. The game server switching method according to claim 1, further comprising, in response to the determining that the first game server does not store the game data requested by the game data obtaining request:

sending, by the first game server, a redirection and place-holding request message to the second game server by using the network-layer proxy subsystem;

sending, by the second game server in response to receiving the redirection and place-holding request message, a redirection and place-holding success message to the first game server by using the network-layer proxy subsystem; and receiving, by the first game server, the redirection and place-holding success message.

5. The game server switching method according to claim 4, further comprising, in response to receiving the redirection and place-holding success message:

sending, by the first game server, a switching notification message to the network-layer access subsystem;

forwarding, by the network-layer access subsystem in response to receiving the switching notification message, the switching notification message to the load balancer; and forwarding, by the load balancer in response to receiving the switching notification message, the switching notification message to the game client.

6. The game server switching method according to claim 1, further comprising, in response to the establishing the communication connection between the network-layer access subsystem and the second game server:

sending, by the network-layer access subsystem, a route switching success message to the first game server by using the network-layer proxy subsystem; and in response to receiving the route switching success message, triggering, by the first game server, sending the write-back request to the role login management server.

7. The game server switching method according to claim 1, further comprising, in response to the obtaining the user role data by the second game server:

sending, by the second game server, a game server switching success message to the game client by using the network-layer proxy subsystem, the network-layer access subsystem, and the load balancer.

8. A game server switching system, comprising a load balancer, a network-layer access subsystem, a network-layer proxy subsystem, a game logic subsystem, and a role login management server, a communication connection being established between the load balancer and a game client, the load balancer being connected to the network-layer access subsystem, the network-layer access subsystem being connected to the network-layer proxy subsystem, the network-layer proxy subsystem being connected to the game logic subsystem, the game logic subsystem being connected to the role login management server, and the game logic subsystem comprising a first game server and a second game server, the first game server communicating with the game client by using the network-layer proxy subsystem, the network-layer access subsystem, and the load balancer; and the first game server being configured to: determine, based on a game data obtaining request from the game client, that the first game server does not store game data requested by the game data obtaining request; and send a route switching request message to the network-layer access subsystem by using the network-layer proxy subsystem;

the network-layer access subsystem being configured to establish a communication connection between the network-layer access subsystem and the second game server based on the route switching request message;

the first game server being further configured to send a write-back request to the role login management server;

the role login management server being configured to send user role data to the second game server based on the write-back request in response to receiving the write-back request; and the second game server being configured to: send, in response to obtaining the user role data from the role login management server, the game data to the game client by using the network-layer proxy subsystem, the network-layer access subsystem, and the load balancer.

9. The game server switching system according to claim 8, wherein the load balancer is configured to receive the game data obtaining request from the game client; and send the game data obtaining request to the network-layer access subsystem;

the network-layer access subsystem is further configured to send the game data obtaining request to the network-layer proxy subsystem in response to receiving the game data obtaining request; and the network-layer proxy subsystem is further configured to send the game data obtaining request to the first game server in the game logic subsystem in response to receiving the game data obtaining request.

10. The game server switching system according to claim 8, wherein the first game server is configured to: determine, based on the game data obtaining request from the game client, whether the first game server stores the game data requested by the game data obtaining request.

11. The game server switching system according to claim 8, wherein the first game server is further configured to: send, in response to determining, based on the game data obtaining request from the game client, that the first game server does not store the game data requested by the game data obtaining request, a redirection and place-holding request message to the second game server by using the network-layer proxy subsystem;

the second game server is further configured to: send, in response to receiving the redirection and place-holding request message, a redirection and place-holding success message to the first game server by using the network-layer proxy subsystem; and the first game server is further configured to receive the redirection and place-holding success message.

12. The game server switching system according to claim 11, wherein the first game server is further configured to send a switching notification message to the network-layer access subsystem in response to receiving the redirection and place-holding success message;

the network-layer access subsystem is further configured to forward the switching notification message to the load balancer in response to receiving the switching notification message; and the load balancer is further configured to forward the switching notification message to the game client in response to receiving the switching notification message.

13. The game server switching system according to claim 8, wherein the network-layer access subsystem is further configured to: send, in response to establishing the communication connection between the network-layer access subsystem and the second game server based on the route switching request message, a route switching success message to the first game server by using the network-layer proxy subsystem; and the first game server is further configured to, in response to receiving the route switching success message, triggering sending the write-back request to the role login management server.

14. The game server switching system according to claim 8, wherein the second game server is further configured to send a game server switching success message to the game client by using the network-layer proxy subsystem, the network-layer access subsystem, and the load balancer.

15. A server, applied to the game server switching system, the game server switching system comprising the load balancer, the network-layer access subsystem, the network-layer proxy subsystem, the game logic subsystem, and the role login management server, and the server being any one of the load balancer, the network-layer access subsystem, the network-layer proxy subsystem, the game logic subsystem, and the role login management server; and the server comprising:

at least one memory operable to store program code; and at least one processor operable to read the program code and operate as instructed by the program code to perform operations of the load balancer, the network-layer access subsystem, the network-layer proxy subsystem, the game logic subsystem, or the role login management server of the game server switching system of claim 8.

16. A non-transitory computer-readable storage medium, comprising an instruction, which, when executed by at least one processor, causes the at least one processor to perform a game server switching method, applied to a game server switching system, the game server switching system comprising a load balancer, a network-layer access subsystem, a network-layer proxy subsystem, a game logic subsystem, and a role login management server, a communication connection being established between the load balancer and a game client, the load balancer being connected to the network-layer access subsystem, the network-layer access subsystem being connected to the network-layer proxy subsystem, the network-layer proxy subsystem being connected to the game logic subsystem, the game logic subsystem being connected to the role login management server, and the game logic subsystem comprising a first game server and a second game server, the first game server communicating with the game client by using the network-layer proxy subsystem, the network-layer access subsystem, and the load balancer; and the method comprising:

determining, based on a game data obtaining request from the game client, that the first game server does not store game data requested by the game data obtaining request, and sending a route switching request message to the network-layer access subsystem by using the network-layer proxy subsystem;

establishing a communication connection between the network-layer access subsystem and the second game server based on the route switching request message;

sending a write-back request to the role login management server;

sending, in response to receiving the write-back request, user role data to the second game server based on the write-back request; and sending, in response to obtaining the user role data from the role login management server, the game data to the game client by using the network-layer proxy subsystem, the network-layer access subsystem, and the load balancer.

17. The computer-readable storage medium according to claim 16, wherein the instruction further causes the at least one processor to perform:

receiving the game data obtaining request from the game client;

sending the game data obtaining request to the network-layer access subsystem;

sending, in response to receiving the game data obtaining request, the game data obtaining request to the network-layer proxy subsystem; and sending, in response to receiving the game data obtaining request, the game data obtaining request to the first game server in the game logic subsystem.

18. The computer-readable storage medium according to claim 16, wherein the determining that the first game server does not store the game data requested by the game data obtaining request comprises:

determining, based on the game data obtaining request from the game client, whether the first game server stores the game data requested by the game data obtaining request.

19. The computer-readable storage medium according to claim 16, wherein the instruction further causes the at least one processor to perform, in response to the determining that the first game server does not store the game data requested by the game data obtaining request:

sending a redirection and place-holding request message to the second game server by using the network-layer proxy subsystem;

sending, in response to receiving the redirection and place-holding request message, a redirection and place-holding success message to the first game server by using the network-layer proxy subsystem; and receiving the redirection and place-holding success message.

20. The computer-readable storage medium according to claim 16, wherein the instruction further causes the at least one processor to perform, in response to receiving the redirection and place-holding success message:

sending a switching notification message to the network-layer access subsystem;

forwarding, in response to receiving the switching notification message, the switching notification message to the load balancer; and forwarding, in response to receiving the switching notification message, the switching notification message to the game client.

\* \* \* \* \*